United States Patent [19]

Hunter et al.

[11] Patent Number: 5,369,423
[45] Date of Patent: Nov. 29, 1994

[54] METHOD AND APPARATUS FOR THE AUTOMATIC CALIBRATION OF AN ANALOG RASTER OUTPUT SCANNER

[75] Inventors: Timothy M. Hunter, Webster; Joseph Chiang, Fairport; David Birnbaum, Pittsford; John L. Zanghi, Fairport, all of N.Y.

[73] Assignee: Xerox Corporation, Stamford, Conn.

[21] Appl. No.: 886,208

[22] Filed: May 21, 1992

[51] Int. Cl.⁵ .............................................. B41J 2/235
[52] U.S. Cl. ................................................... 346/108
[58] Field of Search ..................... 346/108, 1.1, 107 R, 346/76 L, 160; 358/296, 300, 302, 406, 474, 298

[56] References Cited
U.S. PATENT DOCUMENTS

| 3,787,887 | 1/1974 | Burton | 346/108 |
| 4,367,926 | 1/1983 | Hohki | 359/310 |
| 4,647,981 | 3/1987 | Froelich | 358/285 |
| 4,746,987 | 5/1988 | Traino et al. | 358/406 |
| 4,748,515 | 5/1988 | Van Daele et al. | 358/293 |
| 4,751,377 | 6/1988 | Ishizaka et al. | 250/205 |
| 4,757,389 | 7/1988 | Clark et al. | 358/298 |
| 4,763,199 | 8/1988 | Suzuki | 358/280 |
| 4,980,778 | 12/1990 | Wittman | 358/446 |
| 5,123,024 | 6/1992 | Dowd et al. | 372/38 |
| 5,165,074 | 11/1992 | Melino | 358/481 |

Primary Examiner—Mark J. Reinhart
Attorney, Agent, or Firm—Duane C. Basch

[57] ABSTRACT

The present invention is a method and apparatus for automatically monitoring the output intensity of an analog raster output scanning (ROS) system. The invention further includes the ability to recognize when the output intensity is not within a predetermined tolerance range, where the system will automatically recalibrate to achieve a desired linear transformation from the input image greyscale intensity to the ROS exposure intensity.

13 Claims, 5 Drawing Sheets

METHOD AND APPARATUS FOR THE AUTOMATIC CALIBRATION OF AN ANALOG RASTER OUTPUT SCANNER

This invention relates generally to a method and apparatus for calibrating an analog raster output scanner, and more particularly to the automatic recognition of the need for recalibration of the analog raster output scanner in order to provide a linear modulation transfer curve therein.

BACKGROUND OF THE INVENTION

The present invention may be employed in a digital, continuous tone, or color copier which is capable of producing continuous tone output from digital input, using an analog raster output scanner (ROS). While it is commonly known to use halftoning techniques, error diffusion and pulse-width modulation to digitally represent continuous tone images with a binary ROS, these techniques are unavailable for the control of an analog output ROS. Moreover, reproducing continuous tone images requires precise control of the exposure intensity, for example, the intensity of a laser beam impinging upon a photosensitive surface.

In an analog ROS system employing a laser as the light source, two difficulties are encountered in attempting to accurately control the exposure intensity of the laser light beam. The first is the typical nonlinear characteristic of the acousto-optic modulator (AOM) which modulates the exposure beam intensity in accordance with an input intensity level. Second are the fluctuations in the intensity of the beam produced by the laser, due primarily to warm-up and aging effects.

Heretofore, various techniques have been employed to calibrate or adjust raster input scanners (RISs) and ROSs. Some of the approaches used are illustrated in the following disclosures which may be relevant:

U.S. Pat. No. 4,980,778
Patentee: Wittman
Issued: Dec. 23, 1990

U.S. Pat. No. 4,763,199
Patentee: Suzuki
Issued: Aug. 9, 1988

U.S. Pat. No. 4,757,389
Patentee: Clark et al.
Issued: Jul. 12, 1988

U.S. Pat. No. 4,751,377
Patentee: Ishizaka et al.
Issued: Jun. 14, 1988

U.S. Pat. No. 4,748,515
Patentee: Van Daele et al.
Issued: May 31, 1988

U.S. Pat. No. 4,647,981
Patentee: Froelich
Issued: Mar. 3, 1987

The relevant portions of the foregoing patents may be briefly summarized as follows:

U.S. Pat. No. 4,980,778 to Wittman discloses a method of correcting non-uniformities in an optical system of a document scanning apparatus. This system includes a plurality of light sensors, each of which have an analog output voltage which varies in proportion to the level, or intensity, of light impinging upon them. The magnitude of the various correction signals are determined during a calibration procedure.

U.S. Pat. No. 4,763,199 to Suzuki teaches a method of reproducing a halftone image, wherein inputted digital image information is converted to an analog form and then compared with a periodic analog pattern signal to obtain pulse-width modulated and binarized image information. A laser driver, whose operation is based upon a pulse-width modulated signal is used to modulate the recording beam.

U.S. Pat. No. 4,757,389 to Clark et al. discloses a calibration method for obtaining correction values to correct for non-uniformities among photosites in an image scanning array associated with electronic image scanning systems. In the system disclosed, light intensity representing an original image is converted into an analog voltage which is then converted into a digital signal using an analog-to-digital (A/D) converter. Accurate calibration is achieved by adjusting image signal outputs of the nonuniform photosites by combining the image signal output of each photosite with a corrective voltage for that particular photosensor.

U.S. Pat. No. 4,751,377 to Ishizaka et al. teaches a light beam scanning recording apparatus, and method, in which a light beam is modulated according to image signals representing an image to be recorded. The method enables the image to be recorded with constant intensity, irrespective of fluctuations in the development conditions of the recording material.

U.S. Pat. No. 4,748,515 to Van Daele et al. discloses a method and apparatus for generating correcting signals to correct a video signal output from an electro-optical document reading apparatus. The method of generating the correction factor signals employs a successive approximation technique.

U.S. Pat. No. 4,647,981 to Froelich teaches a circuit for determining the amount of deviation of intensity level of a scanning beam in a ROS from a desired level during a calibration phase. A correction value is determined as a function of the deviation value, the correction being used during an actual reading or writing phase to normalize the output. A photomultiplier tube (PMT) may be used to collect light reflected from a calibration strip. The output of the PMT is compared to a threshold, stored, and reconverted to an analog voltage which is then used to control the light beam intensity.

The present invention is a method and apparatus for automatically monitoring the output intensity of an analog raster output scanning system. The invention further includes the ability to recognize when the output intensity is not within a predetermined tolerance range, at which time the system will automatically recalibrate to achieve a desired linear transformation from the input image greyscale intensity to the ROS exposure intensity.

In accordance with the present invention, there is provided an analog raster output scanner having a light source for creating a beam of light which is regulated by a modulator responsive to a voltage signal which represents an image intensity level for a spot to be produced on an output medium. The modulated light beam exposes an output medium in proportion to the image intensity level. The raster output scanner is also able to monitor the modulated light beam intensity generated in response to a predetermined intensity level, and compare the actual light beam intensity with a desired intensity to generate a difference signal.

In accordance with another aspect of the present invention, there is provided a method for maintaining a linear output transfer function in an analog raster output scanner. The raster output scanner first programs a look-up table with a set of digital output values, and then uses the look-up table to generate the digital output values in response to image intensity signals received by the raster output scanner. Periodically the scanner passes a predetermined test intensity signal to the look-up table to generate a test digital output value. Subsequently, the intensity of a modulated light beam produced in response to the test digital output value is measured. The scanner then determines whether the measured intensity is within a target range, and if so, continues normal operation. Otherwise, the scanner automatically recalibrates itself to produce a new set of look-up table values and loads the values into the programmabie look-up table.

In accordance with yet another aspect of the present invention, there is provided a method for generating a plurality of distinct intensity values representing a mapping function in an analog raster output scanner. The mapping function, implemented as a look-up table, produces a modulation signal in response to an image intensity signal, and the modulation signal is then used to modulate the intensity of a light beam. The method begins by selecting a test level, i, and generating a modulated light beam in response to the selected test level. Next, the intensity of the modulated light beam is measured and a value indicative of the measured intensity is stored in a memory location indexed in accordance with the selected test level. This process is repeated until all possible values of i have been selected. Subsequently, stored intensity values representative of desired output intensities for each of a series of possible image intensity signals, j, are isolated and stored in the look-up table for use in generating digital output values in response to image intensity signals received by the raster output scanner.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

Figure 1:
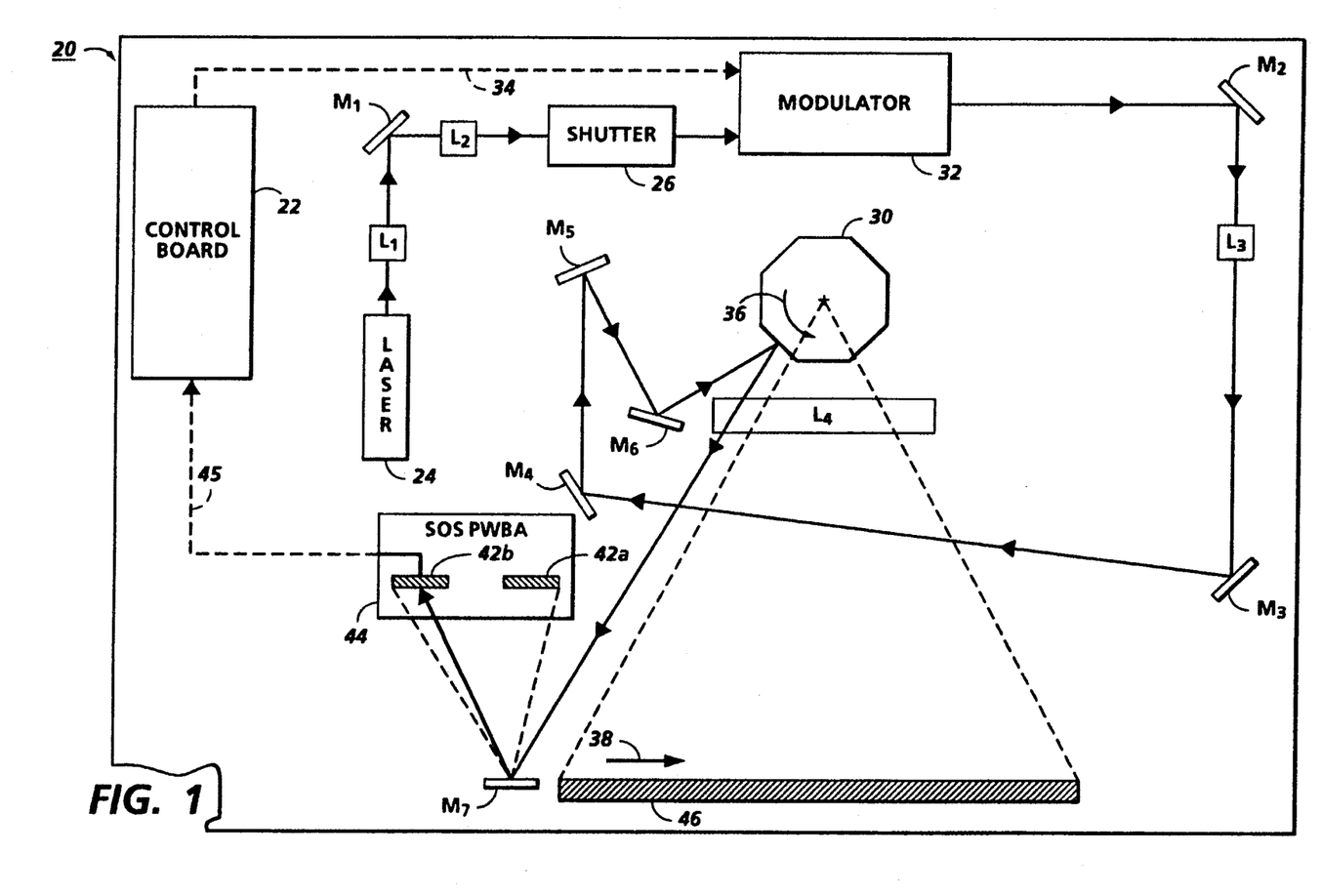
FIG. 1 is a simplified plan view illustrating an embodiment of the present invention.

For a general understanding of the automatic analog ROS calibration operation of the present invention, reference is made to the drawings. In the drawings, like reference numerals have been used throughout to designate identical elements. FIG. 1 shows a simplified view of the electro-mechanical elements of an analog raster output scanner (ROS), 20. The ROS is controlled by signals from control board 22, which receives image intensity signals and other control signals from an external source (not shown). During normal operation, laser 24 is used to produce a beam of light that is first focussed by lens $L_1$, before being reflected by mirror $M_1$. Subsequently, the light beam passes through lens $L_2$ and then shutter 26, where the beam is regulated in an "on" or "off" fashion in accordance with the rotational position of polygon 30, and the position of a photoconductive element (not shown) which is exposed by the light beam. When allowed to pass through shutter 26, the light beam is then modulated by an analog acousto-optic modulator, 32. Modulator 32 is directly controlled by a voltage signal output from control board 22, so that the intensity of the beam allowed to pass through modulator 32 is proportional to the level of the voltage signal supplied on line 34.

Subsequent to modulation, the light beam is reflected by a series of mirrors, $M_2$, $M_3$, $M_4$, $M_5$, and $M_6$, and passes through lens assembly $L_3$, before it reaches the rotating polygon mirror, 30. Polygon 30 is a commonly known multifaceted mirror suitable for reflecting the light beam across a linear path to perform an exposure scan. More specifically, as polygon 30 rotates in the direction indicated by arrow 36, the light beam is directed across a line in the direction of arrow 38. At the start of a scan, when the beam first impinges upon a facet of polygon 30, the beam is reflected, through lens assembly $L_4$, so that it hits mirror $M_7$. In turn the beam is reflected to ROS beam intensity sensor 42b and start-of-scan (SOS) sensor 42a, both of which are on the start-of-scan printed wiring board (SOS PWBA), 44. SOS sensor 42a is used to determine the position of the ROS beam and to indicate the start of a scanline when the beam is detected. ROS beam intensity sensor 42b, on the other hand, detects the intensity of the beam and transforms it into an analog signal. ROS beam intensity sensor 42b may be a photodiode or similar element capable of generating a voltage in proportion to the intensity of an impinging light, or similar radiant energy, beam. The analog beam intensity signal is then passed to control board 22, via line 45, for subsequent processing. As the polygon continues to rotate, the light beam is swept across the exit window, 46, where it passes through to expose a photoresponsive surface (not shown) lying beyond window 46.

Figure 2:
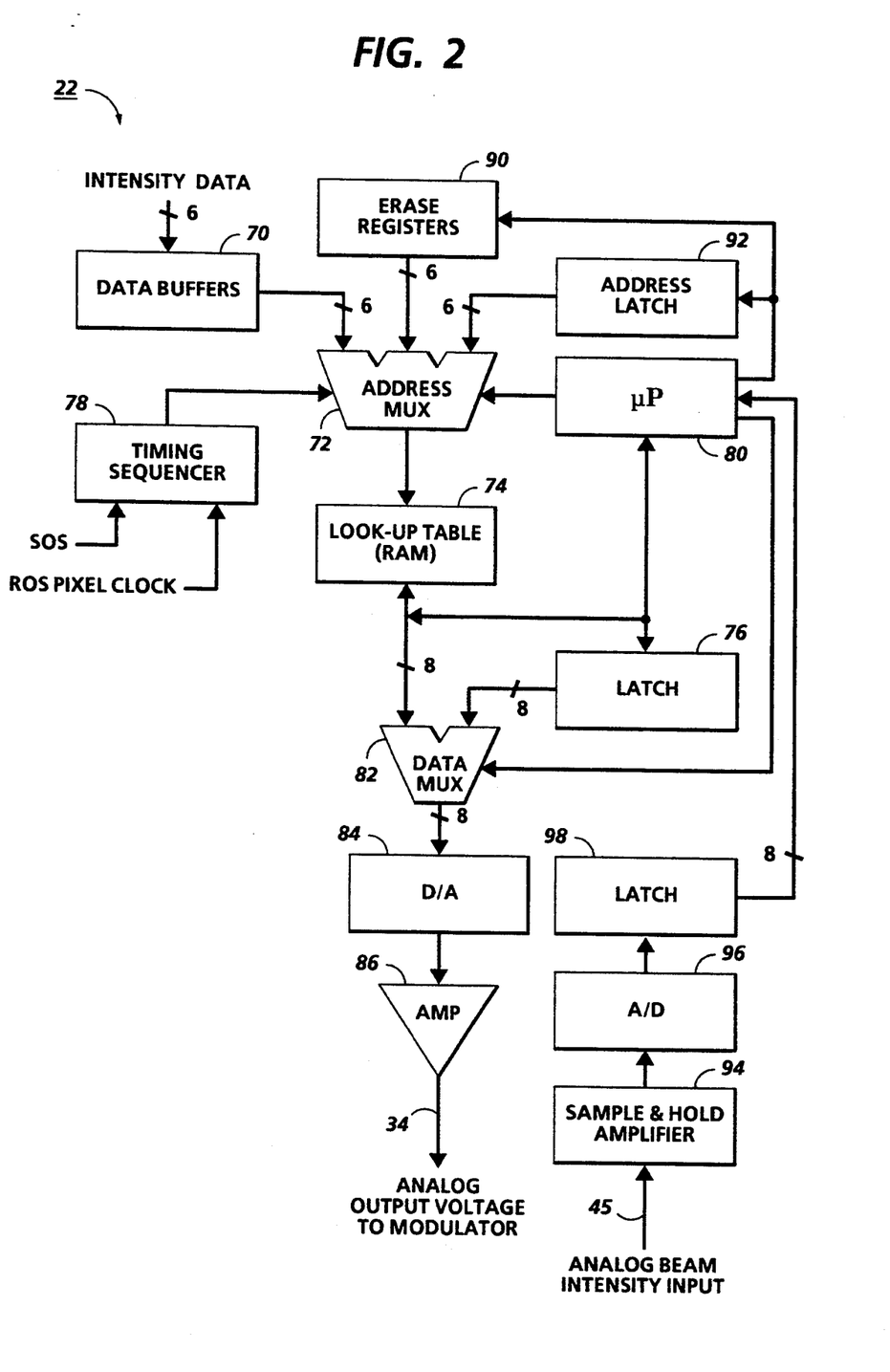
FIG. 2 is an electrical block diagram showing the details of the components contained on the control board of FIG. 1.

Referring now to FIG. 2, which illustrates the basic blocks contained on control board 22, an image intensity signal is received from an external source by data buffer 70. During a normal printing cycle, the data in buffer 70 is passed to address multiplexer (MUX) 72, where it is in turn used as an index into a look-up table contained in random access memory (RAM) 74. The address multiplexer is controlled either by the timing sequencer, 78 or by microprocessor ($\mu$P) 80, which may be any suitable microprocessor, such as an Intel® 8085®. Normally, address multiplexer 72 is controlled by the timing sequencer, to allow the intensity data to be passed to RAM 74. RAM 74 thereby generates an 8-bit output value, in response to the multiplexed input data, and passes the output to data multiplexer 82. RAM 74 is a high-speed static RAM configured as a look-up table, where a 6-bit input value is used as an index to produce a corresponding 8-bit output value from a unique memory location. Subsequently, the data is allowed to pass to a high-speed digital-to-analog (D/A) converter, 84, where it is transformed into a voltage signal. The voltage signal is then amplified at amplifier 86 and passed to modulator 32, via line 34, where it is used to control the modulation of the beam intensity as previously described. While the embodiment illustrated in FIG. 2 indicates 6-bit image intensity values being mapped to the 8-bit data values used for modulator control, the present invention contemplates the use of higher resolution digital data by increasing the resolution of the various components within the data path.

Using erase registers 90, the control board is also capable of injecting predetermined 6-bit values into address multiplexer 72, to cause the eventual generation of an analog voltage signal that represents the predetermined 6-bit value. This feature may be utilized to modulate the ROS when no image signals are available, for example, between output rasters, or between successive output pages. Similarly, address latch 92 may be used in the same way to generate a predetermined analog voltage signal. However, latch 92 is directly controlled by microprocessor 80, and it would therefore be possible to selectively update the value contained in the latch at any time. As will be described with respect to the calibration procedure, the value stored in latch 92 is used by microprocessor 80 to monitor the output intensity of the modulated light beam.

Microprocessor 80 is utilized to control the operation of control board 22, and to perform monitoring functions which determine when the system requires calibration. During initialization of the monitoring operation, and prior to the receipt of valid image intensity data by buffer 70, microprocessor 80 sets the analog output signal to full erase by writing FFh (hexadecimal value) to data multiplexer 82, via data latch 76. As previously described, this results in the maximum analog output signal being passed to modulator 32, which in turn produces the maximum beam intensity. During this erasure initialization period, a bias voltage which is also supplied to modulator 32 is adjusted to achieve the desired erase characteristics, as measured by an electrostatic voltmeter (not shown) positioned near the photoconductive imaging member. Once the modulator bias voltage is set, complete exposure, or erasure of the latent charge on the photoconductive member is achieved when a value of FFh is supplied to the data multiplexer.

Figure 3A:
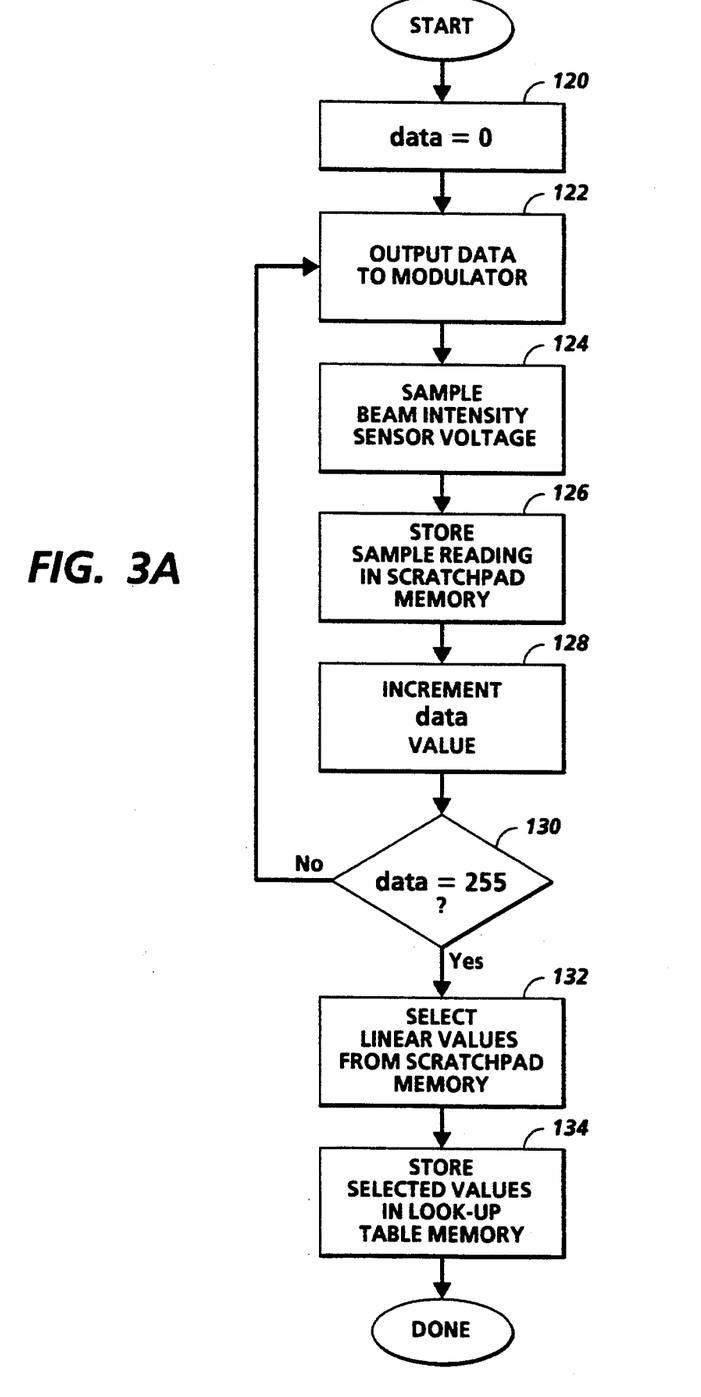
FIGS. 3A and 3B are flowcharts which represent the steps of the calibration operation performed in accordance with the present invention.

Subsequently, microprocessor 80 is used to calibrate ROS modulator 32 in order to achieve a linear transfer curve (e.g., FIG. 4, curve B) that can be stored in the look-up table, RAM 74. Referring to FIG. 3A, which illustrates the basic steps to the calibration process, initially, at step 120, a data value of zero is output to data latch 76, to produce the modulator voltage, step 122. When the beam sweeps past ROS beam intensity sensor 42b, the reflected beam received by the sensor is converted to an analog voltage signal on SOS PWBA 44 and returned to control board 22 on line 45. The beam intensity sensor output is then sampled, step 124, by sample and hold amplifier 94. Subsequently, analog-to-digital (A/D) converter 96 converts the beam intensity signal to an 8-bit digital value that is stored in latch 98. Microprocessor 80 then reads the data from latch 98 and stores it in a scratchpad memory location within the microprocessor memory, step 126.

Figure 4:
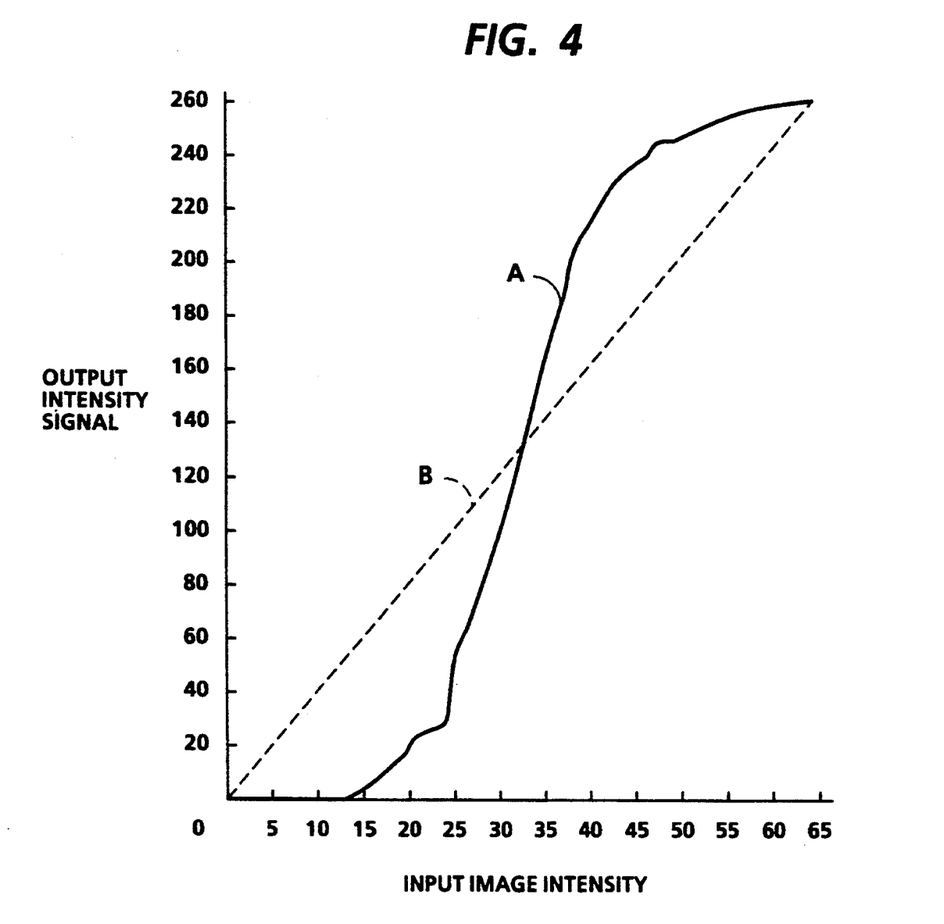
FIG. 4 is a graphical representation of the actual and desired modulator transfer functions for the analog ROS.

Having retrieved and stored the beam intensity level, microprocessor 80 then increments the data value stored in latch 76, step 128, and tests to see if all possible data values have been used at step 130. If not, processing continues as previously described, at step 122 using the incremented data value. If, on the other hand, all the possible data values have been output, the microprocessor scratchpad memory would then contain an intensity value for each of the two-hundred and fifty-six possible modulator voltage levels. Curve A of FIG. 4 is representative of a typical modulator transfer function. Clearly, the extremes of the actual transfer function indicate that the modulator would be unable to accurately represent input image intensity values which lie at the upper and lower ends of the range without a remapping of the transfer curve. Steps 132 and 134 are subsequently executed to select, and store in the look-up table memory, those data values that produced the desired linear output, as shown by curve B of FIG. 4. It should be noted that while the present embodiment assumes that a linear transfer function is desired it is entirely possible to select data values that would produce a customized nonlinear transfer curve as required for a specific output application. Such a modification is, therefore, intended to be covered by the present invention.

Figure 3B:
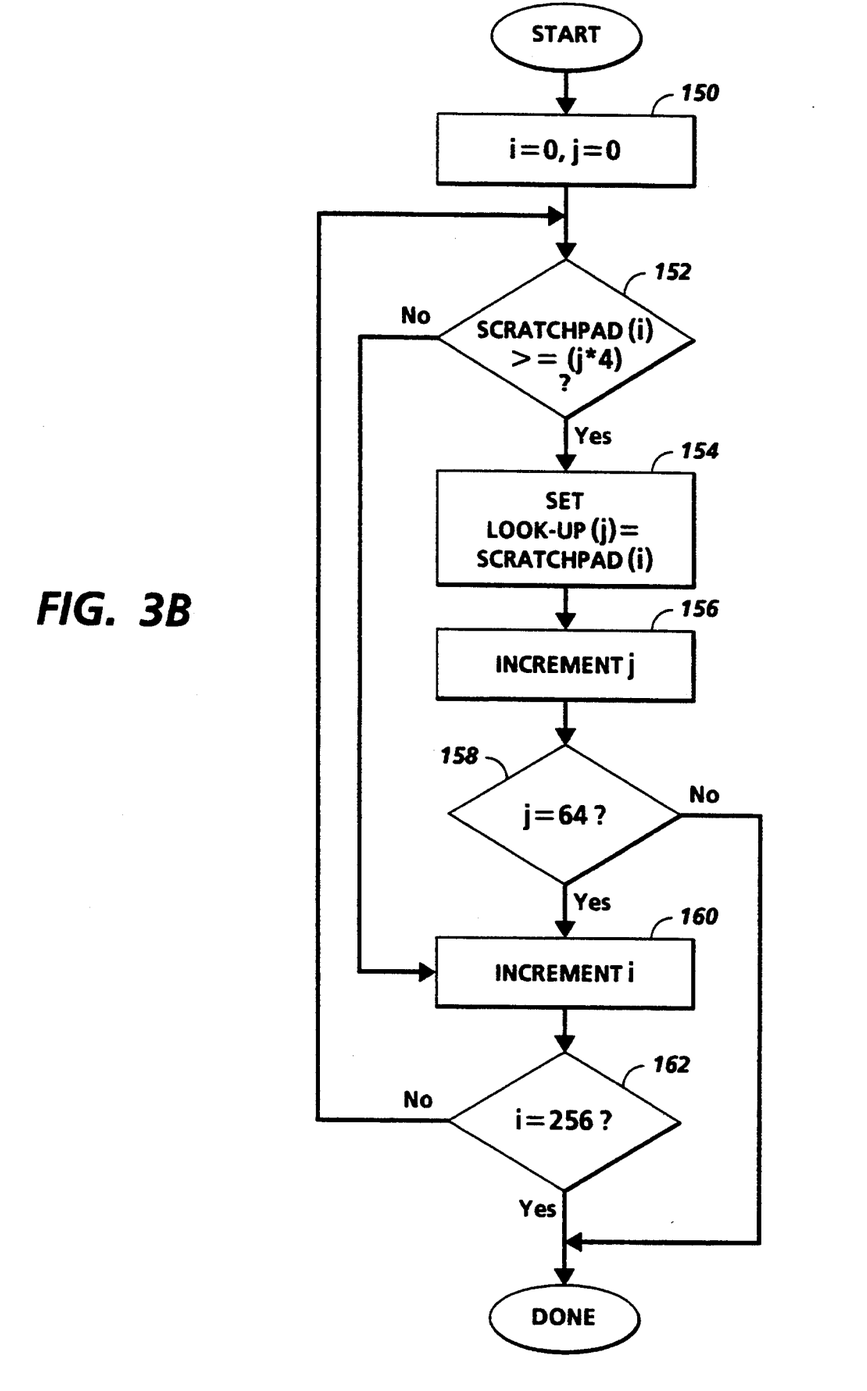

Referring now to FIG. 3B, which shows the specific details of the select and store operations of steps 132 and 134, respectively, the process begins at step 150, where index variables i and j are initialized. These variables would generally be maintained within registers of microprocessor 80. Using variables i and j as index variables, microprocessor 80 then tests to determine if the intensity value contained in the scratchpad memory, at an offset of i from the start of the intensity values, is equal to or greater than the value (j*4), step 152. The test value, j*4, is based upon the need to reduce the range of possible 8-bit modulation values (0–255) to sixty-four possible image intensity values, thus, the factor of four is applied. Furthermore, alternative tests may be employed at step 152 to achieve a customized mapping of the transfer function.

In the present embodiment, if the scratchpad memory intensity value is less than the test value, j*4, the process continues by incrementing index variable i, step 160, and testing to see if all intensity values have been utilized, step 162, prior to continuing the loop at step 152. Otherwise, the intensity value is stored at the appropriate point in the look-up table, as represented by step 154. After storing a value in the look-up table, index variable j is incremented at step 156 and tested at step 158, to assure that more look-up table values are required. Subsequently, the remainder of the loop, steps 160 and 162 are executed to increment and test index variable i as previously described. The looping process is continued until output modulation data values have been selected and stored for each of the possible input image intensity values represented by the look-up table now stored in RAM 74.

Having calibrated the ROS modulator to provide a linear transfer curve for the input image intensity values, the ROS is ready to modulate the beam to produce greyscale output in response to the input image intensity data. However, during this "normal" operation, microprocessor 80 continues to monitor the beam intensity measured by beam intensity sensor 42. During each sweep or scan of the light beam, address latch 92 is used to inject a predetermined input value into RAM 74. The predetermined value is injected, under the control of timing sequencer 78, into the stream of data used to modulate the beam during the sweep. Thus, when the beam sweeps across mirror $M_7$ of FIG. 1, the beam intensity is controlled by the predetermined value in address latch 92. Subsequently, microprocessor 80 retrieves the measured intensity of the beam, as previously described, and compares it to a desired intensity, as determined from the intensity values stored in the look-up table. If the measured intensity differs from the desired intensity by more than an acceptable amount, the microprocessor automatically begins to recalibrate the ROS modulator as previously described with respect to FIGS. 3A and 3B. In an alternative embodiment, the microprocessor may average the intensity values returned from the beam intensity sensor for a number of output rasters, while injecting the same predetermined value, thereby obtaining a more accurate representation of the beam intensity. In addition, while the predetermined value may be any value in the range 0– 64, it may occasionally be varied in order to test the response of the ROS modulator over the entire range of the transfer curve.

In recapitulation, the present invention is a method and apparatus for controlling the operation of an analog raster output scanner to achieve an accurate rendition of digital greyscale image data. The invention utilizes a look-up table to implement a mapping function in order to achieve a desired linear transfer function. Moreover, the invention monitors the performance of the analog modulator used to control the exposure and automatically regenerates the mapping function using a calibration operation when the exposure falls out of a pre-established tolerance.

It is, therefore, apparent that there has been provided, in accordance with the present invention, a method and apparatus for automatically calibrating an analog raster output scanner. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. An analog raster output scanner comprising:
 means for generating a radiant energy beam;
 means for producing a voltage signal which represents a desired intensity level of a spot to be produced on an output medium;
 means for modulating the intensity of the radiant energy beam, in response to the voltage signal, to produce a modulated energy beam which exposes the output medium in proportion to the desired intensity level;
 means for monitoring the modulated radiant energy beam intensity generated in response to a predetermined intensity level, said monitoring means comparing the radiant energy beam intensity with the desired intensity to generate a difference signal; and
 means for initiating calibration of the voltage signal producing means upon a determination that the magnitude of the difference signal exceeds a threshold level.

2. The analog raster output scanner of claim 1, wherein the voltage signal producing means comprises:
 a data buffer for receiving and storing a desired image intensity value;
 means for determining a digital output signal in response to the image intensity value stored in the data buffer; and
 a digital to analog converter to convert the digital output signal into the voltage signal.

3. The analog raster output scanner of claim 2 wherein said determining means is a programmable memory.

4. An analog raster output scanner comprising:
 means for generating a radiant energy beam;
 means for producing a voltage signal which represents a desired intensity level of a spot to be produced on an output medium;
 means for modulating the intensity of the radiant energy beam, in response to the voltage signal, to produce a modulated energy beam which exposes the output medium in proportion to the desired intensity level; and
 means for monitoring the modulated radiant energy beam intensity for a predetermined intensity level, said monitoring means comparing the radiant energy beam intensity with the desired intensity to generate a difference signal; and
 means for calibrating the voltage signal producing means upon a determination that the magnitude of the difference signal exceeds a threshold level, said calibrating means including:
 means for supplying a predetermined digital output signal to the voltage signal producing means;
 means for sensing the intensity of the radiant energy beam being modulated in response to the predetermined digital output signal, the sensing means generating a digital intensity signal representative of the energy beam intensity in response thereto;
 memory for storage of the digital intensity signal produced by the sensing means;
 a microprocessor for controlling the operation of the signal supplying means and the sensing means so as to store the digital intensity signals generated by the sensing means in unique memory locations associated with the level of the predetermined digital output signal value; and
 means, controlled by the microprocessor, for selecting a subset of the digital intensity signals stored in the memory and storing the digital intensity signals in the look-up table.

5. The analog raster output scanner of claim 4 wherein the sensing means comprises:
 a photodiode which produces a voltage signal in proportion to the intensity of the modulated radiant energy beam;
 a sample and hold amplifier suitable for amplifying the photodiode voltage signal;
 an analog to digital converter for transforming the amplified voltage signal into the digital intensity signal; and
 a digital latch adapted to capture the digital intensity signal from the analog to digital converter.

6. The analog raster output scanner of claim 1, wherein the modulating means comprises an acousto-optic modulator.

7. The analog raster output scanner of claim 1, wherein the monitoring means comprises:
 a photodiode which produces a voltage signal in proportion to the intensity of the modulated radiant energy beam;
 a sample and hold amplifier adapted to amplify the photodiode voltage signal;
 an analog to digital converter for transforming the amplified photodiode voltage signal into a digital value;
 a digital latch adapted to capture the digital output value from the analog to digital converter; and means for generating the difference signal as a function of the difference between the predetermined intensity level and the digital output value.

8. A method for maintaining a linear output transfer function in an analog raster output scanner, comprising the steps of:
   (a) generating digital output values from a look-up table, in response to image intensity signals received by the raster output scanner;
   (b) passing, periodically, a predetermined image value to the look-up table to generate a test digital output value therefrom;
   (c) measuring the intensity of a modulated light beam produced in response to the test digital output value;
   (d) determining whether the measured intensity is within a target range; and if not
   (e) calibrating the analog raster output scanner to produce a new set of look-up table values; and
   (f) loading the new set of look-up table values generated in step (e) into the programmable look-up table.

9. The method claim 8, wherein the step of generating digital output values comprises the steps of:
   (a) programming the look-up table with a set of digital output values; and
   (b) reading, using the image intensity value as an index, the digital output value from the look-up table.

10. The method of claim 9, wherein the step of calibrating the analog raster output scanner, comprises the steps of:
    (a) selecting an image test level, i;
    (b) generating a modulated radiant energy beam in response to the selected test level, i;
    (c) measuring the intensity of the modulated radiant energy beam;
    (d) storing an average of at least one value indicative of the measured radiant energy beam intensity in a unique memory location;
    (e) repeating steps (a) through (d) until all values of i in a range of 0 to m have been selected, where m is a maximum test level; and
    (f) isolating, within the memory locations, stored intensity values which are representative of desired output intensities for each of a series of possible image intensity signals, j, where j is in the range of 0 to n, and where n is the maximum number of look-up table values and is less than m, so that the isolated intensity signals may be stored in the look-up table for use in generating digital output values in response to the image intensity signals received by the raster output scanner.

11. The method of claim 10, wherein the step of isolating stored intensity values, comprises the steps of:
    (a) initializing a first index variable to zero;
    (b) initializing a second index variable to zero;
    (c) calculating a desired transfer curve threshold as a function of the value of the second index variable;
    (d) determining, using the first index variable, if the beam intensity value contained in the memory at an address offset by the value of the first index variable is less than the desired transfer curve threshold;
    (e) storing the beam intensity value in the look-up table at an address offset by the value of the second index variable from the beginning of the look-up table memory if the beam intensity value determined in step (d) is not less than the transfer curve threshold;
    (f) incrementing the second index variable if the beam intensity value determined in step (d) is not less than the transfer curve threshold;
    (g) incrementing the first index variable; and
    (h) repeating the above steps, beginning with step (c), until all n−1 intensity values in the look-up table memory have been determined.

12. A method for generating a plurality of distinct intensity values representing a mapping function in an analog raster output scanner which uses the mapping function, implemented as a look-up table, to generate a modulation signal which modulates a light beam, all in response to an image intensity signal, comprising the steps of:
    (a) modulating the light beam in response to a selected test level;
    (b) measuring the intensity of the modulated light beam;
    (c) averaging, over at least two repetitions of steps (a) and (b), the modulated light beam intensities measured in step (b);
    (d) saving the average intensity determined in step (c) in a unique memory location;
    (e) repeating steps (a) through (d) for each selected test level:
    (f) identifying, from the saved average intensities, those intensities which represent desired output intensities for each of a series of possible input image intensity signals; and
    (g) storing the intensity values identified in step (f) in the look-up table for subsequent use in generating intensity values in response to the image intensity signals received by the raster output scanner.

13. A method for generating a plurality of distinct intensity values representing a mapping function in an analog raster output scanner which uses the mapping function, implemented as a look-up table, to generate a modulation signal which modulates a light beam, all in response to an image intensity signal, comprising the steps of:
    (1) modulating the light beam in response to a selected test level;
    (2) measuring the intensity of the modulated light beam;
    (3) averaging, over at least two repetitions of steps (1) and (2), the modulated light beam intensities measured in step (2);
    (4) saving the average intensity determined in step (3) in a unique memory location;
    (5) repeating steps (1) through (4) for each selected test level;
    (6) identifying, from the saved average intensities, those intensities which represent desired output intensities for each of a series of possible input image intensity signals, including the steps of:
       (a) initializing a first index variable to zero;
       (b) initializing a second index variable to zero;
       (c) calculating a desired transfer curve threshold as a function of the value of the second index variable;
       (d) determining if the beam intensity value contained in the memory, at an offset equal to the first index variable value, is less than the transfer curve threshold;
       (e) identifying the beam intensity as an intensity to be stored in the look-up table if the beam intensity value determined in step (d) is not less than the transfer curve threshold;

(f) incrementing the second index variable if the beam intensity value determined in step (d) is not less than the transfer curve threshold;

(g) incrementing the first index variable; and (h) repeating the above steps, beginning with step (c) until all intensity values in the look-up table memory have been determined; and (7) storing the intensity values identified in step (6) in the look-up table for subsequent use in generating intensity values in response to the image intensity signals received by the raster output scanner.

* * * * *